US007882556B2

(12) United States Patent
Ahn et al.

(10) Patent No.: US 7,882,556 B2
(45) Date of Patent: Feb. 1, 2011

(54) METHOD AND APPARATUS FOR PROTECTING LEGITIMATE TRAFFIC FROM DOS AND DDOS ATTACKS

(75) Inventors: Gaeil Ahn, Daejeon (KR); Ki-Young Kim, Daejeon (KR); Jong Soo Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1287 days.

(21) Appl. No.: 10/535,455

(22) PCT Filed: Mar. 28, 2003

(86) PCT No.: PCT/KR03/00628
§ 371 (c)(1),
(2), (4) Date: May 19, 2005

(87) PCT Pub. No.: WO2004/047383
PCT Pub. Date: Jun. 3, 2004

(65) Prior Publication Data
US 2006/0041667 A1 Feb. 23, 2006

(30) Foreign Application Priority Data
Nov. 19, 2002 (KR) .................. 10-2002-0071890

(51) Int. Cl.
*G06F 9/00* (2006.01)
*G06F 15/16* (2006.01)
*G06F 17/00* (2006.01)
(52) U.S. Cl. ................... 726/13; 726/23; 713/153; 713/160; 709/224; 709/235; 709/240; 370/235
(58) Field of Classification Search .................. 726/13
See application file for complete search history.

(56) References Cited

U.S. PATENT DOCUMENTS 6,650,643 B1 * 11/2003 Dobson .................. 370/395.1

(Continued)

FOREIGN PATENT DOCUMENTS

KR    1020020058765    12/2002

(Continued)

OTHER PUBLICATIONS

Kargl et al. (hereinafter Kargl) "Protecting Web Servers from Distributed Denial of Service Attacks", pp. 514-524, 2001.*

(Continued)

*Primary Examiner*—Matthew B Smithers
*Assistant Examiner*—Shewaye Gelagay
(74) *Attorney, Agent, or Firm*—Lowe Hauptman Ham & Berner LLP

(57) ABSTRACT

An apparatus for protecting legitimate traffic from DoS and DDoS attacks has a high-priority (505) and a low-priority (506) queue. Besides, a queue information table (402) has STT (Source-based Traffic Trunk) service queue information of a specific packet. A queue coordinator (502) updates the queue information table (502) based on a load of a provided STT and a load of the high-priority queue (505). A packet classifier (504) receives a packet from the network access unit (508), investigates an STT service queue of the packet from the queue information table (502), selectively transfers the packet to the high-priority (505) or the low-priority (506) queue and provides information on the packet to the queue coordinator (503). A buffer (507) buffers outputs of the high-priority (505) and the low-priority (506) queue and provides outputs to the network (509) to be protected.

19 Claims, 11 Drawing Sheets

U.S. PATENT DOCUMENTS

| | | | |
|---|---|---|---|
| 7,058,974 B1 * | 6/2006 | Maher et al. | 726/13 |
| 7,299,277 B1 * | 11/2007 | Moran et al. | 709/224 |
| 2002/0112061 A1 | 8/2002 | Shih et al. | |
| 2003/0076848 A1 * | 4/2003 | Bremler-Barr et al. | 370/412 |

FOREIGN PATENT DOCUMENTS

| | | |
|---|---|---|
| WO | 02/03084 | 1/2002 |
| WO | 02/19661 | 3/2002 |
| WO | 02/33870 | 4/2002 |
| WO | 02/35755 | 5/2002 |

OTHER PUBLICATIONS

Gaeil Ahn, et al.; "Effective Traffic Control Scheme for Protecting Legitimate Traffic from Malicious Traffic on Internet"; Proceedings of the 2002 WSEAS International Conference on Information Security Hardware/Software Codesign, E-Commerce and Computer Networks; Oct. 15-17, 2002; pp. 1611-1616.

David K. Y. Yau, et al.; "Defending Against Distributed Denial-of-Service Attacks with Max-min Fair Server-centric Router Throttles"; 2002 IEEE; pp. 35-44.

Shung Li, et al.; "Active Gateway: A Facility for Video Conferencing Traffic Control"; Computer Software and Applications Conferences, 1997, COMPSAC'97, Proceedings; The Twenty-First Annual International Washington, DC, USA Aug. 13-15, 1997; Los Alamitos, CA, USA; IEEE Comput. Soc., US; pp. 308-311.

Jun Xu, et al.; "A Novel Cache Architecture to Support Layer-Four Packet Classification at Memory Access Speeds"; INFOCOM 2000. Nineteenth Annual Joint Conference of the IEEE Computer and Communications Societies; Proceedings. IEEE Tel Aviv, Israel Mar. 26-30, 2000, Piscataway, NJ. USA; IEEE, US pp. 1445-1454.

* cited by examiner

US 7,882,556 B2

METHOD AND APPARATUS FOR PROTECTING LEGITIMATE TRAFFIC FROM DOS AND DDOS ATTACKS

CROSS REFERENCE TO RELATED APPLICATION

This application is the National Phase application of International Application No. PCT/KR2003/000628, filed Mar. 28, 2003, which designates the United States and was published in English. This application, in its entirety, is incorporated herein by reference.

FIELD OF THE INVENTION

The present invention relates to a method and apparatus for protecting legitimate traffic from denial of service (hereinafter, referred to as DoS) and distributed denial of service (hereinafter, referred to as DDoS) attacks; and, more particularly, to a method and apparatus for protecting the legitimate traffic from an enormous traffic volume generated by the DoS and DDoS attacks.

BACKGROUND OF THE INVENTION

A DoS attack concentrates large volume of traffic on a target network/server in a short time so that the target system is not able to provide services. A DDoS attack, which is one type of DoS attack, concentrates traffic of multitude of attacking sites on the target network/server at once, and therefore, it is more difficult to detect and cut off.

According to attacking method, the DoS attacks are categorized into attacks using characteristics of a TCP protocol and attacks for simply congesting traffic.

Attacks using the characteristics of a TCP protocol are performed as a three-step operation of setting up a connection between a TCP client and a TCP server. First of all, the client sends a synchronous (SYN) packet to the server. Secondly, the server sends a synchronous acknowledge (SYN-ACK) packet to the client. As a final step, the client sends the ACK packet to the server. A TCP SYN flooding attack is an example of such attack, which keeps sending the SYN packet to the server but ignores the SYN-ACK packet transmitted by the server.

Attacks for simply congesting traffic are divided into a UDP packet flooding attack, a ping flooding attack and a HTTP flooding attack.

Conventional techniques for cutting off such DoS attacks are described as follows:

(1) a technique for improving an algorithm of a TCP protocol server
(2) a fair-queuing technique
(3) a rate-limit technique The technique for improving the algorithm of the TCP protocol server is restrictively used for cutting off conventional SYN packet flooding attacks, so that it is not able to avoid traffic congestion attacks.

The fair-queuing technique is used for controlling congestion and fairly distributing resources (bandwidth) in a router. FIG. 1 is a drawing for showing a basic algorithm of a conventional fair-queuing. Each of transmitted packets is separated on a flow basis and sent to a next node by using a corresponding queue. In this case, queues are fairly distributed by using a round-robin service, so that each queue is provided with 1/n of a total link bandwidth. While the technique is able to effectively cut off DoS attacks, DDoS attacks are not completely avoidable. That is to say, the more increase the total number of malicious flows, the more decrease the bandwidth share allocated to legitimate flows.

The rate-limit technique cuts off not only TCP SYN flooding attacks but also traffic congestion attacks.

FIG. 2 illustrates a basic algorithm of a conventional rate-limit. The rate-limit technique measures a bandwidth of specific flows. Then, if the measured value exceeds a maximum allowable bandwidth determined by an administrator, surplus packets are dropped. The technique has two drawbacks. First, the administrator is required to check traffic of a network for a certain time in order to determine the maximum allowable bandwidth. Second, it is difficult to effectively cut off DDoS attacks. A power of the DDoS attacks is due to enormous traffic generated by concentrating multitude of attacking sites on one target network/server, and therefore, a volume of traffic generated by each attack site is not considerable. In other words, since there is only a little difference between volumes of traffic generated by an attacking site and a legitimate site in the DDoS attacks, it is very difficult to determine the maximum allowable bandwidth. For example, if the maximum allowable bandwidth is set low, both DDoS traffic and legitimate traffic can be cut off.

As described above, the conventional techniques are effectively used to cut off the DoS attacks but not the DDoS attacks. Further, even if the DDoS attacks can be cut off, the legitimate traffic cannot be protected.

SUMMARY OF THE INVENTION

It is, therefore, an object of the present invention to provide a method and apparatus for protecting legitimate traffic from DoS and DDoS attacks.

In accordance with the present invention, there is provided an apparatus connected between a network access unit and a network to be protected, for protecting legitimate traffic from DoS and DDoS attacks, including: a high-priority queue; a low-priority queue; a queue information table having specific STT service queue information of a specific packet; a queue coordinator for updating the queue information table based on a load of a provided STT and a load of the high-priority queue; a packet classifier for receiving a packet from the network access unit, investigating an STT service queue of the received packet from the queue information table, selectively transferring the received packet to the high-priority queue or the low-priority queue in accordance with an investigation result and providing information on the received packet to the queue coordinator; and a buffer for buffering outputs of the high-priority queue and the low-priority queue and providing the buffered outputs to the network to be protected.

BRIEF DESCRIPTION OF THE DRAWINGS

The above and other objects and features of the present invention will become apparent from the following description of preferred embodiments, given in conjunction with the accompanying drawings, in which.

DETAILED DESCRIPTION OF THE PREFERRED EMBODIMENTS

Hereinafter, preferred embodiments of the present invention will be described in detail with reference to the accompanying drawings.

A flow-unit-processing of DoS and DDoS traffic causes a performance and attack-detection accuracy to be deteriorated and its load to be increased. On the contrary, the present invention processes the DoS and DDoS traffic in a source-based traffic trunk (hereinafter, referred to as STT) unit, wherein the STT refers to a set of flows having a same network address of a source. For instance, if the STT is composed of 24-bit out of 32-bit IP address, every packet using source addresses from 168.188.44.0 to 168.188.44.255 belongs to the STT having a source address of 168.188.44.

Figure 1:
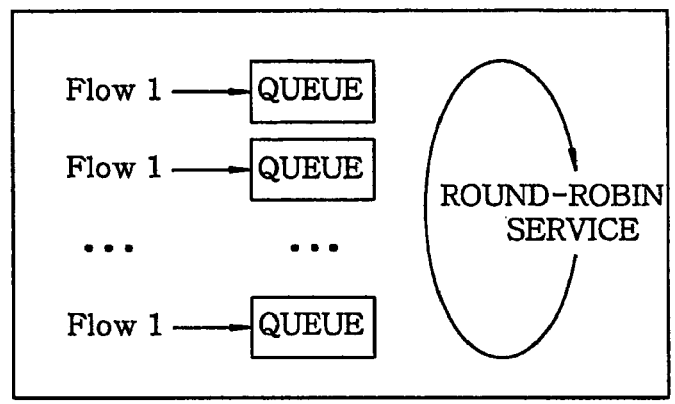
FIG. 1 shows a basic algorithm of a conventional fair-queuing.
Figure 2:
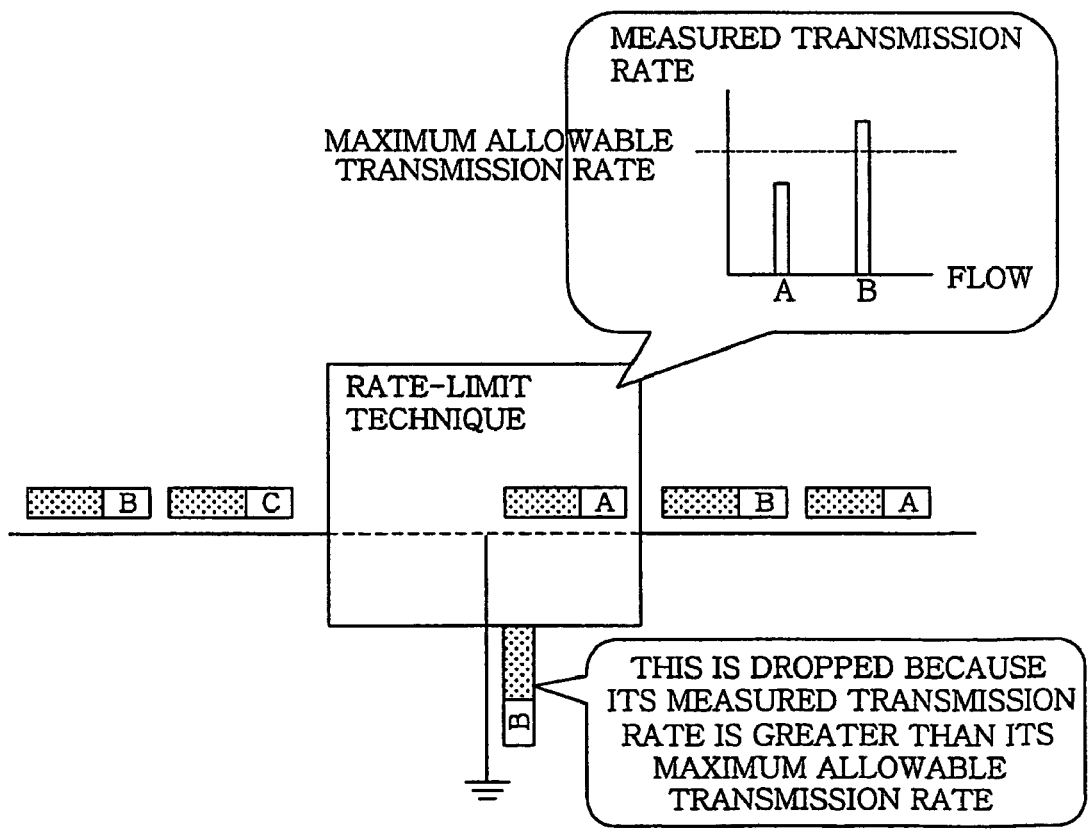
FIG. 2 illustrates a basic algorithm of a conventional rate-limit.
Figure 3:
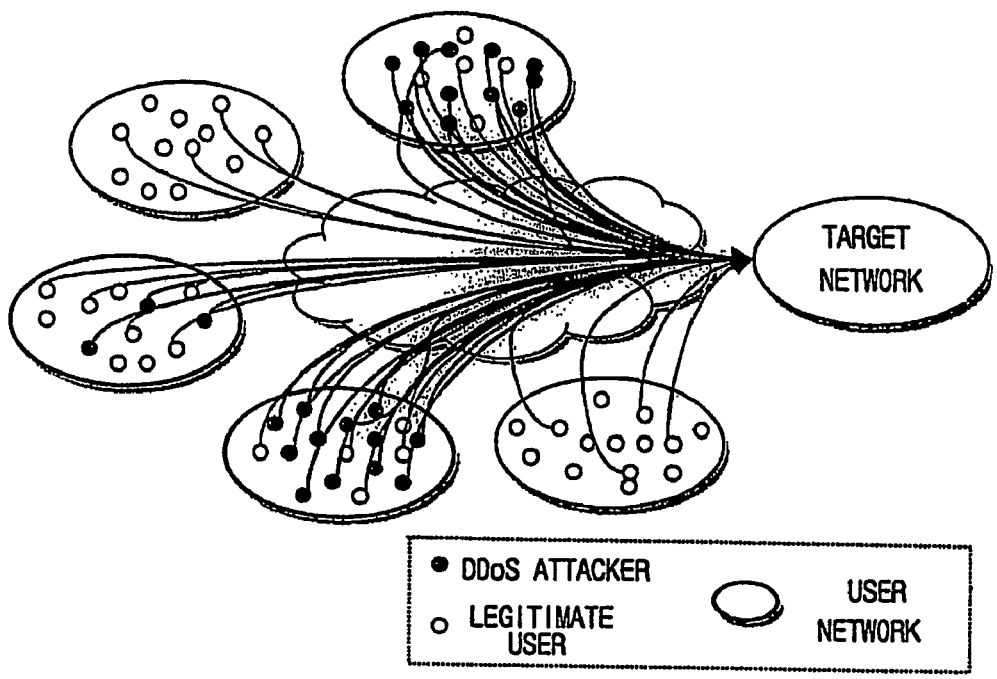
FIG. 3 provides a drawing for showing a typical DDoS attacks modeling.
Figure 4:
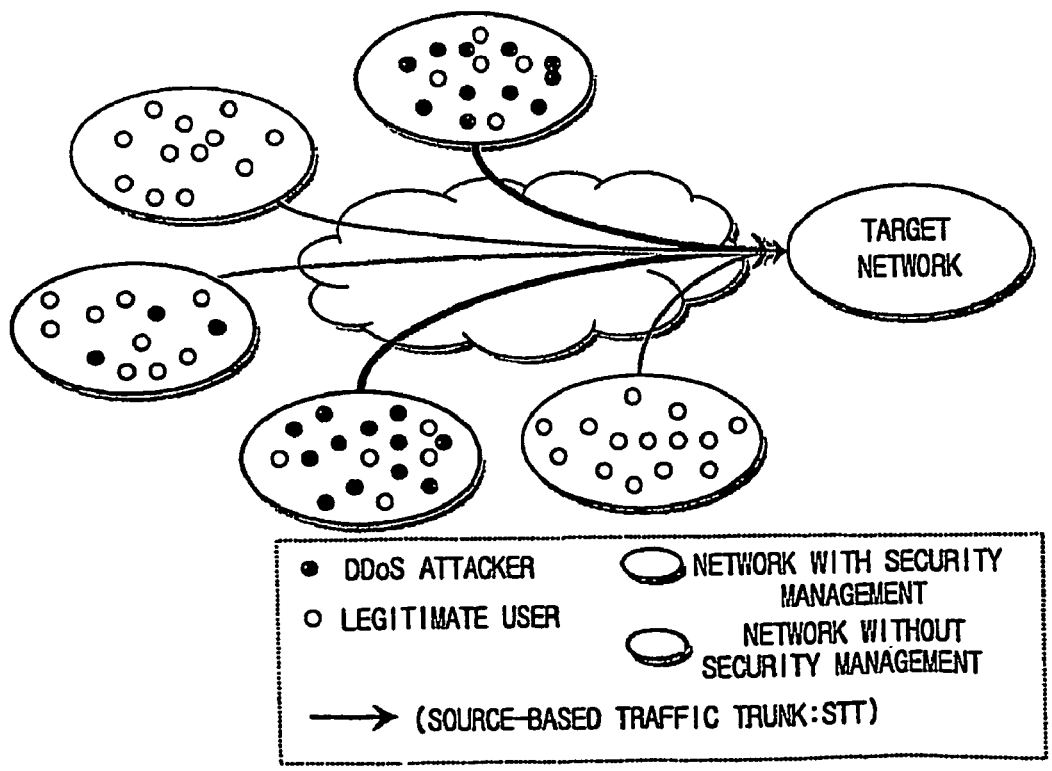
FIG. 4 presents a drawing for illustrating a DDoS attacks modeling employing a source-based traffic trunk (STT) in accordance with the present invention.

FIG. 3 provides a drawing for showing a typical DDoS attacks modeling. FIG. 4 presents a drawing for illustrating a DDoS attacks modeling employing a source-based traffic trunk (STT) in accordance with the present invention.

Sources of DDoS attacks are not uniformly distributed in entire networks, but centralized on certain local networks. Thus, it is impossible for a hacker to perform a hacking on systems in every network in the world to install DDoS attack software therein. Instead, a hacker usually intrudes a certain local network. Further, for example, even if the hacker intrudes an arbitrary system using a Nimda virus and performs DDoS attacks, it is still difficult for the virus to hide in a safe network, i.e., a network installed with a firewall, an intrusion detection system, a virus vaccine application and the like, for a certain time. Accordingly, the virus is normally hidden in a less protected network. A cyber demonstration, which is a type of DDoS attacks, is also performed in certain local networks.

In comparison with a flow-typed method, the STT-typed method is able to more simply and accurately determine whether traffic is legitimate or not.

Figure 5:
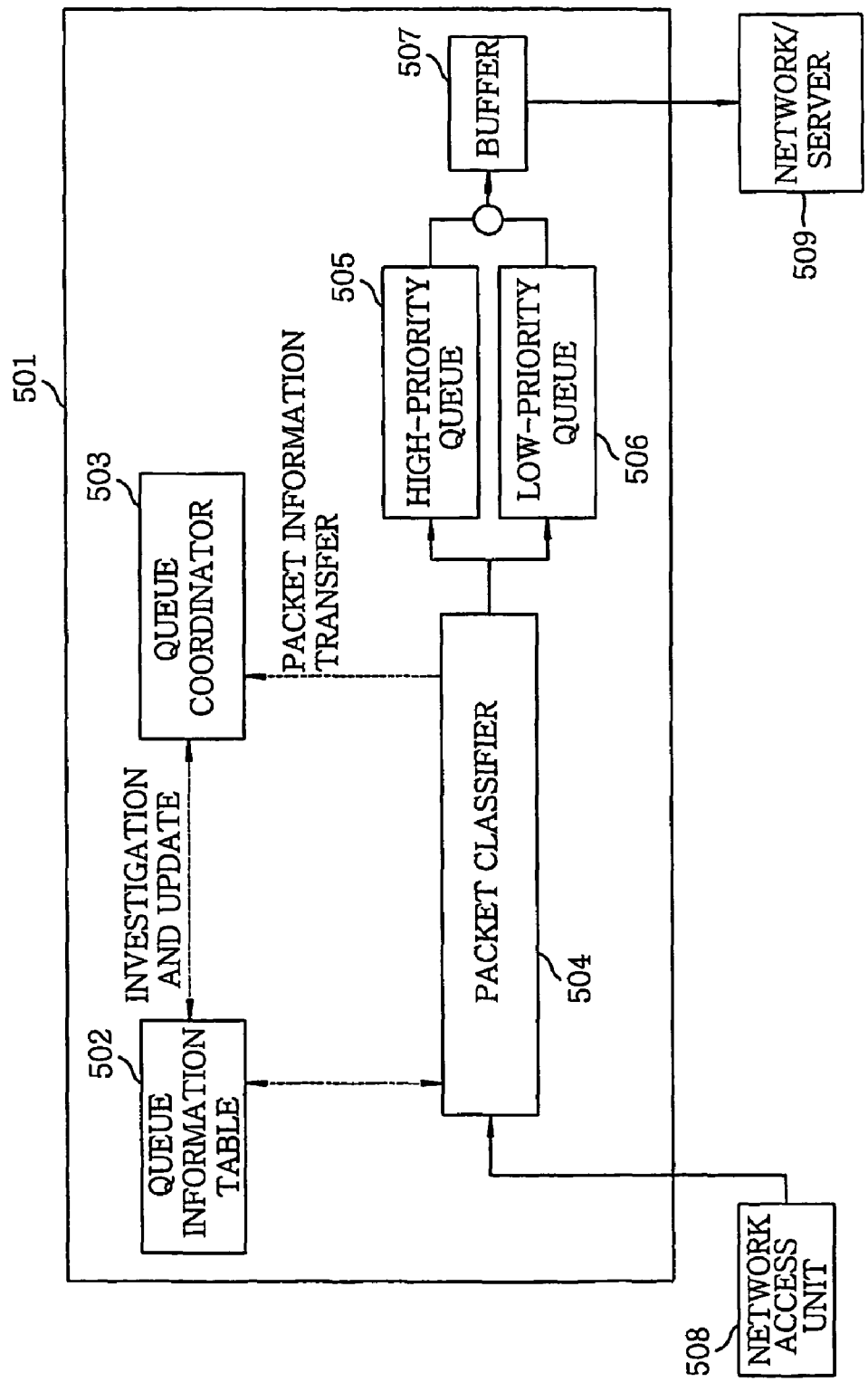
FIG. 5 represents a block diagram for showing a preferred embodiment of an apparatus for protecting legitimate traffic from DoS and DDoS attacks in accordance with the present invention.

FIG. 5 represents a block diagram for showing a preferred embodiment of an apparatus for protecting legitimate traffic from DoS and DDoS attacks in accordance with the present invention. A legitimate traffic protection unit 501 comprises a queue information table 502, a queue coordinator 503, a packet classifier 504, a high-priority queue 505, a low-priority queue 506 and a buffer 507, wherein the legitimate traffic protection unit 501 is connected between a network access unit 508 and a network/server 509 to be protected.

When a packet is received from the network access unit 508, the packet classifier 504 investigates an STT service queue of the packet from the queue information table 502. According to the investigation result, the packet is transferred to the high-priority queue 505 or the low-priority queue 506. Further, information on the packet is transferred to the queue coordinator 503, wherein the information on the packet refers to a packet size, a packet arrival time and an index of the queue information table 502 for representing STT information of the packet and the like.

The queue coordinator 503 updates the queue information table 502 based on a load of the received STT and a load of the high-priority queue 505. The queue information table 502 has fields including an STT ID, a service queue, an average load, a recent load calculation time and a total packet size.

A maximum load of both the high-priority queue 505 and the low-priority queue 506 is set to be a maximum allowable load of the network/server 509 to be protected. For example, in case the maximum allowable load of to-be-protected system is set to 100, a sum of total loads of both the high-priority queue 505 and the low-priority queue 506 should be set to 100. If both the high-priority queue 505 and the low-priority queue 506 have packets, a packet in the high-priority queue 505 is firstly served.

The buffer 507 buffers outputs of the high-priority queue 505 and the low-priority queue 506 and sends the buffered outputs to the network/server 509 to be protected.

Figure 6:
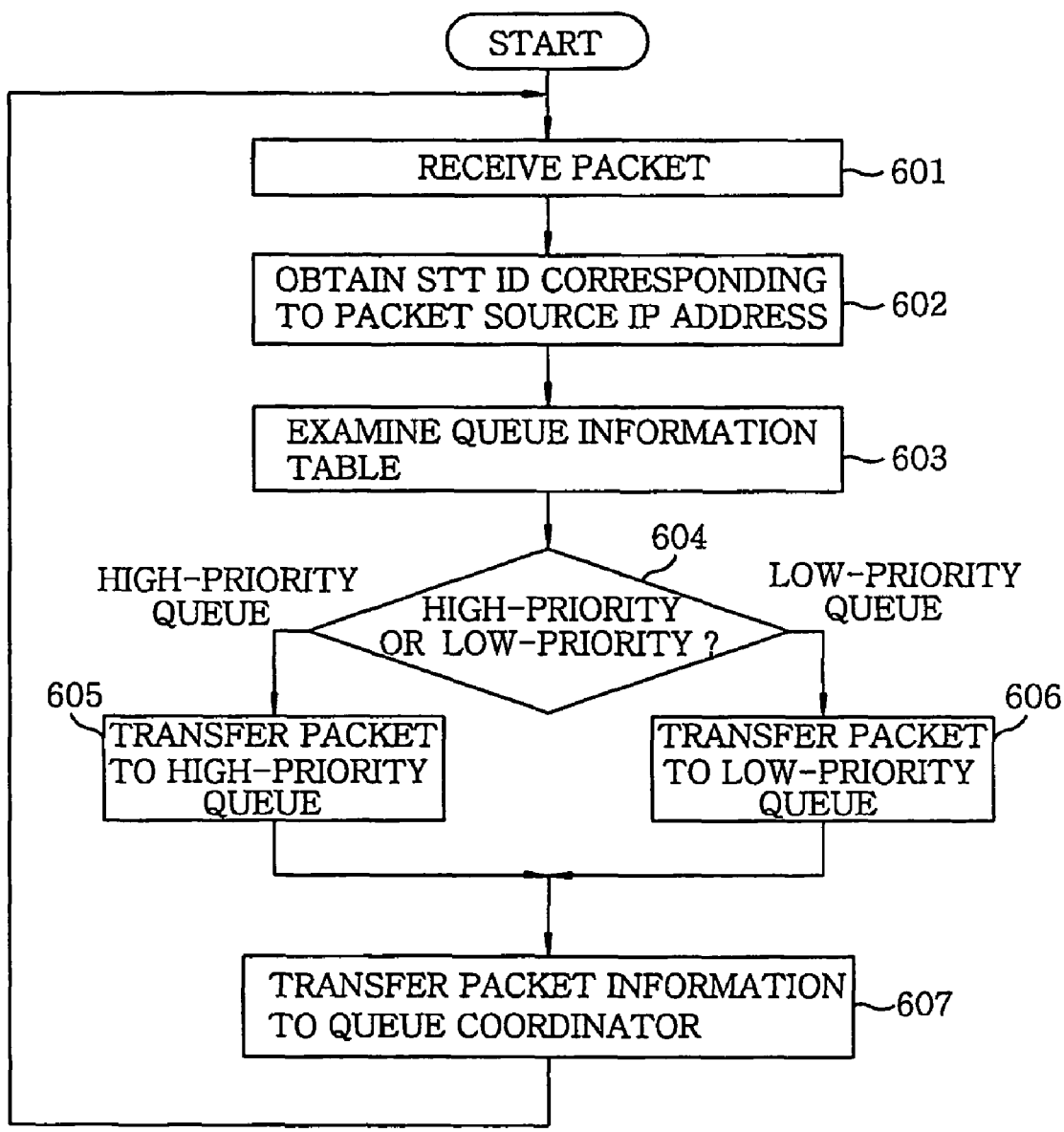
FIG. 6 offers a flowchart for illustrating a basic algorithm of a packet classifier shown in FIG. 5.

FIG. 6 offers a flowchart for illustrating a basic algorithm of the packet classifier 504 shown in FIG. 5.

The packet classifier 504 receives a packet from the network access unit 508 (step 601) and then obtains an STT ID by using a source IP address of the received packet (step 602). Next, the packet classifier 504 searches for a service queue corresponding to the obtained STT ID from the queue information table 502 (step 603). According to the investigation result, the packet classifier 504 selectively transfers the received packet to the high-priority queue 505 and the low-priority queue 506 (steps 604 to 606). Thereafter, the packet classifier 504 transfers packet information to the queue coordinator 503.

Figure 7:
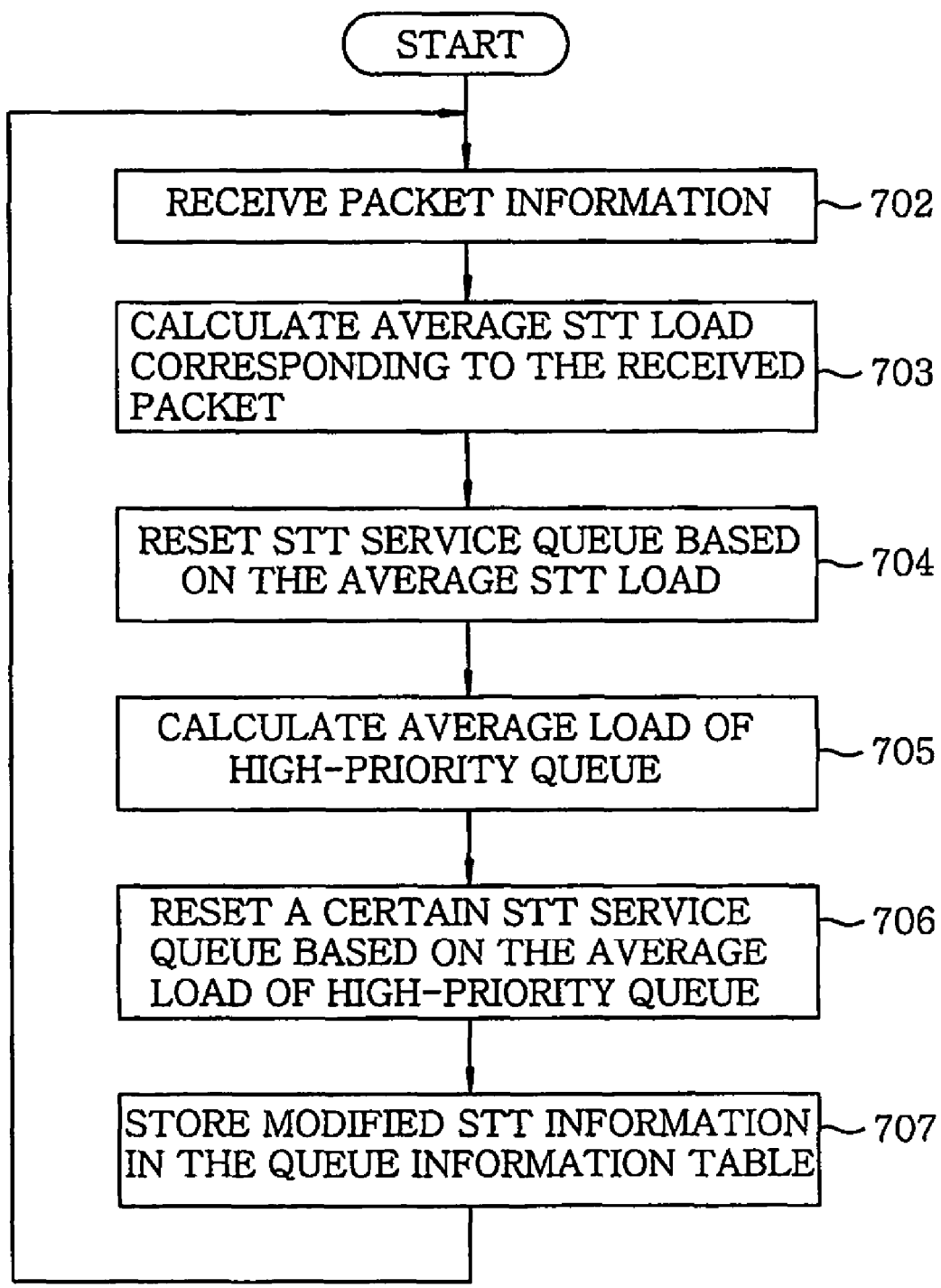
FIG. 7 sets forth a flowchart for showing a basic algorithm of a queue coordinator shown in FIG. 5.

FIG. 7 sets forth a flowchart for showing a basic algorithm of a queue coordinator shown in FIG. 5.

The queue coordinator 503 receives packet information from the packet classifier 504 (step 702) and calculates an average STT load corresponding to the received packet (step 703). Based on the calculated average STT load, the queue coordinator 503 resets an STT service queue (step 704). Next, the queue coordinator 503 calculates an average load of the high-priority queue 505 (step 705) and then resets a certain STT service queue based on the calculated average load of the high-priority queue 505 (step 706). Thereafter, the queue coordinator 503 stores modified STT information such as a modified average load and service queue in the queue information table 502 (step 707).

Figure 8A:
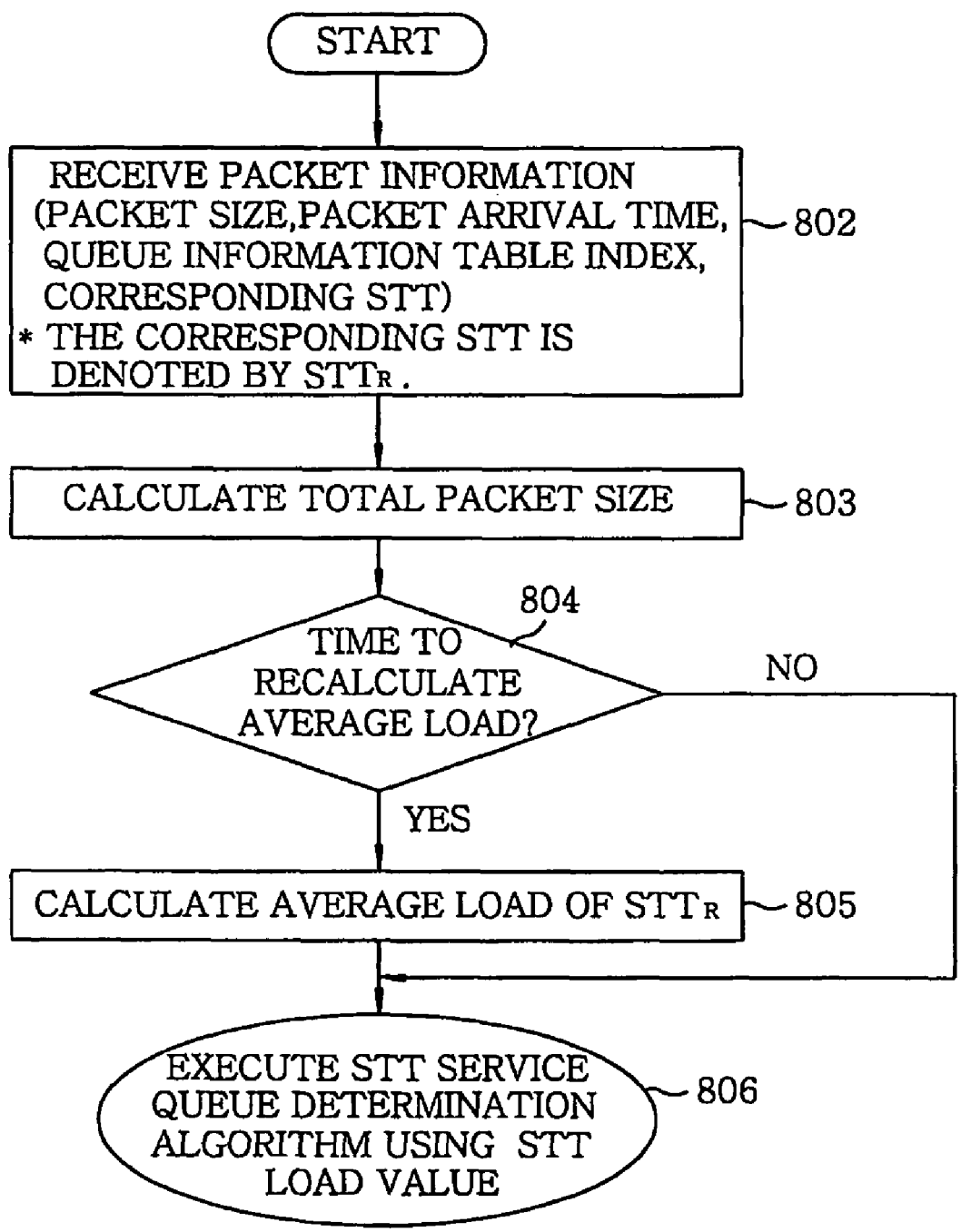
FIG. 8A depicts a flowchart of a detailed algorithm of steps for receiving packet information and calculating an average load of an STT corresponding to a received packet in the basic algorithm of the queue coordinator shown in FIG. 7.

FIG. 8A depicts a flowchart of a detailed algorithm of steps for receiving packet information (step 702) and calculating an average load of an STT corresponding to a received packet (step 703) in the basic algorithm of the queue coordinator 503 shown in FIG. 7.

The queue coordinator 503 receives packet information on a packet size, a packet arrival time, a queue information table index, a corresponding STT and the like from the packet classifier (step 802) and then calculates a total packet size based on the received packet information (step 803), wherein the total packet size is a sum of a previous total packet size and a received packet size. Next, the queue coordinator 503 checks whether it is time to recalculate an average load (step 804). According to the check result, if it is time to recalculate the average load, the queue coordinator 503 calculates a new average load by using a previous average load and a current average load based on the total packet size (step 805). In other words, the average load is calculated as follows: average load=(previous average load*$\alpha$+total packet size)/((packet arrival time−recent load calculation time)*(1−$\alpha$)), wherein $\alpha$ is larger than 0 but smaller than 1, i.e., $0<\alpha<1$. In this case, a time cycle for calculating the load is predetermined by a user. According to the check result of the step 804, if it is not the time to recalculate the average load, the queue coordinator 503 executes an STT service queue determination algorithm using the STT load value (step 806) without performing the step 805.

Figure 8B:
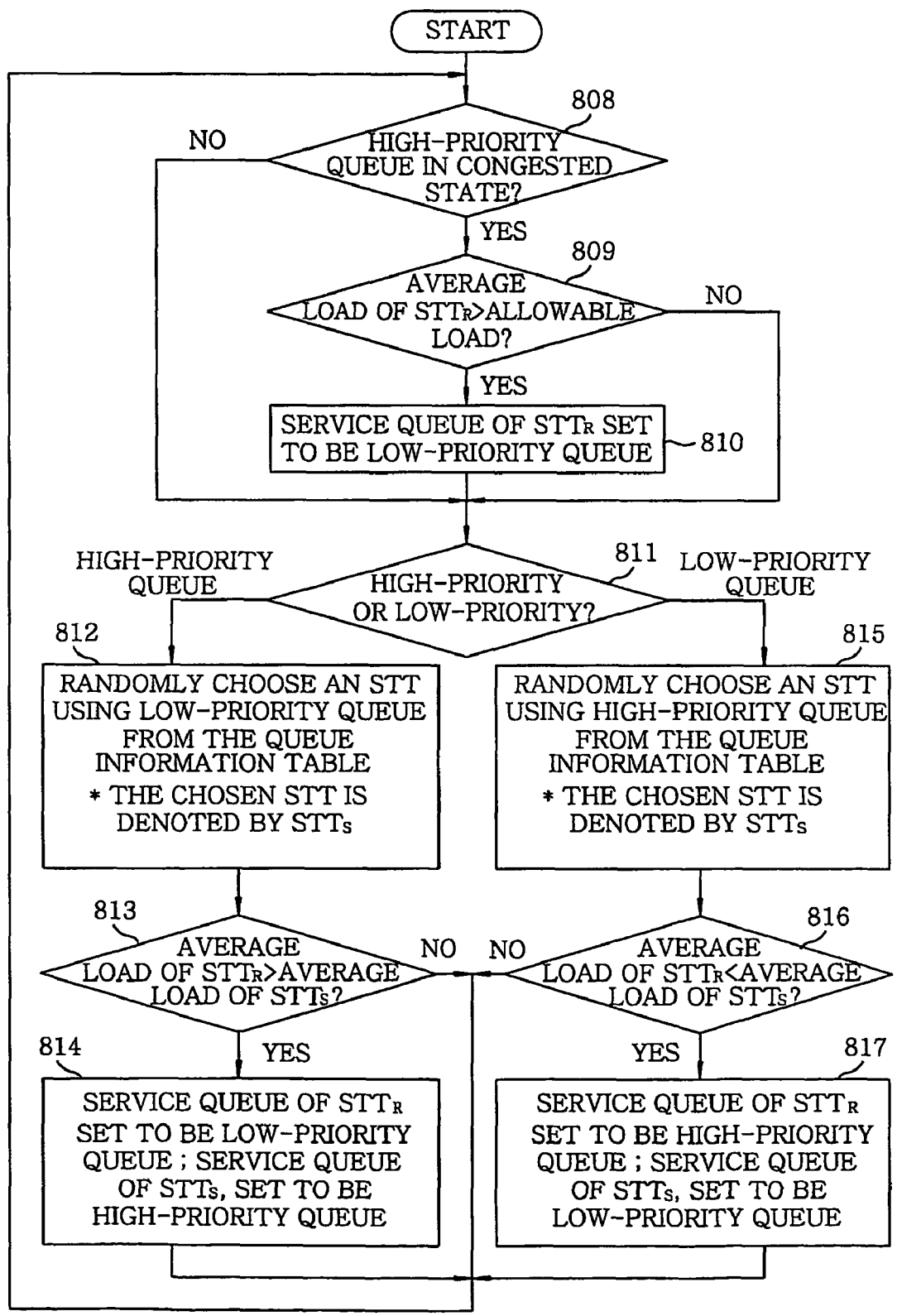
FIG. 8B shows a flowchart of an algorithm of a step for resetting an STT service queue based on the load of the STT in the basic algorithm of the queue coordinator illustrated in FIG. 7.

FIG. 8B shows a flowchart of an algorithm of a step for resetting an STT service queue based on the load of the STT (step 704) in the basic algorithm of the queue coordinator 503 illustrated in FIG. 7. The algorithm in FIG. 8b is carried out whenever a packet is arrived. A purpose of the algorithm is to make an STT of a high average load use the low-priority queue 506 and an STT of a low average load use the high-priority queue 505. Accordingly, DoS and DDoS traffic are supposed to use the low-priority queue.

The queue coordinator 503 checks whether or not the high-priority queue 505 is in a congested state (step 808). According to the check result, if the high-priority queue 505 is in a congested state, it is checked whether an STT load of a received packet is greater than an allowable load (step 809). According to the check result of the step 809, if the STT load of the received packet is greater than the allowable load, a service queue of the STT of the received packet is set to be the low-priority queue 506 (step 810), wherein the allowable load refers to "(an average load of the high-priority queue 505)/(the number of STT using the high-priority queue 505 during a recalculation of the average load)". Thus, a plurality of STT that may correspond to DDoS traffic is supposed to concentrate on the low-priority queue 506 rapidly. The queue coordinator 503 checks whether the service queue of the STT corresponding to the received packet is a high-priority queue or a low-priority queue (step 811). According to the check result of the step 811, if the service queue of the STT corresponding to the received packet is a high-priority queue, an STT using a low-priority queue is randomly chosen from the queue information table 502 (step 812). Next, the queue coordinator 503 compares an average load of the STT corresponding to the received packet with an average load of the randomly chosen STT (step 813). According to the comparison result, if the average load of the STT corresponding to the received packet is greater than that of the randomly chosen STT, a queue of an STT having a low load is set to high-priority and that of an STT having a high load is set to low-priority (step 814). According to the check result of the step 811, if the service queue of the STT corresponding to the received packet is a low-priority queue, an STT using a high-priority queue is randomly chosen from the queue information table 502 (step 815). The queue coordinator compares an average load of the STT corresponding to the received packet with that of the randomly chosen STT (step 816). According to the comparison result, if the average load of the STT corresponding to the received packet is smaller than that that of the randomly chosen STT, a queue of an STT having a low load is set to high-priority and that of an STT having a high load is set to low-priority (step 817). Accordingly, legitimate traffic and the DDoS traffic are respectively supposed to use a high-priority queue and a low-priority queue.

Figure 8C:
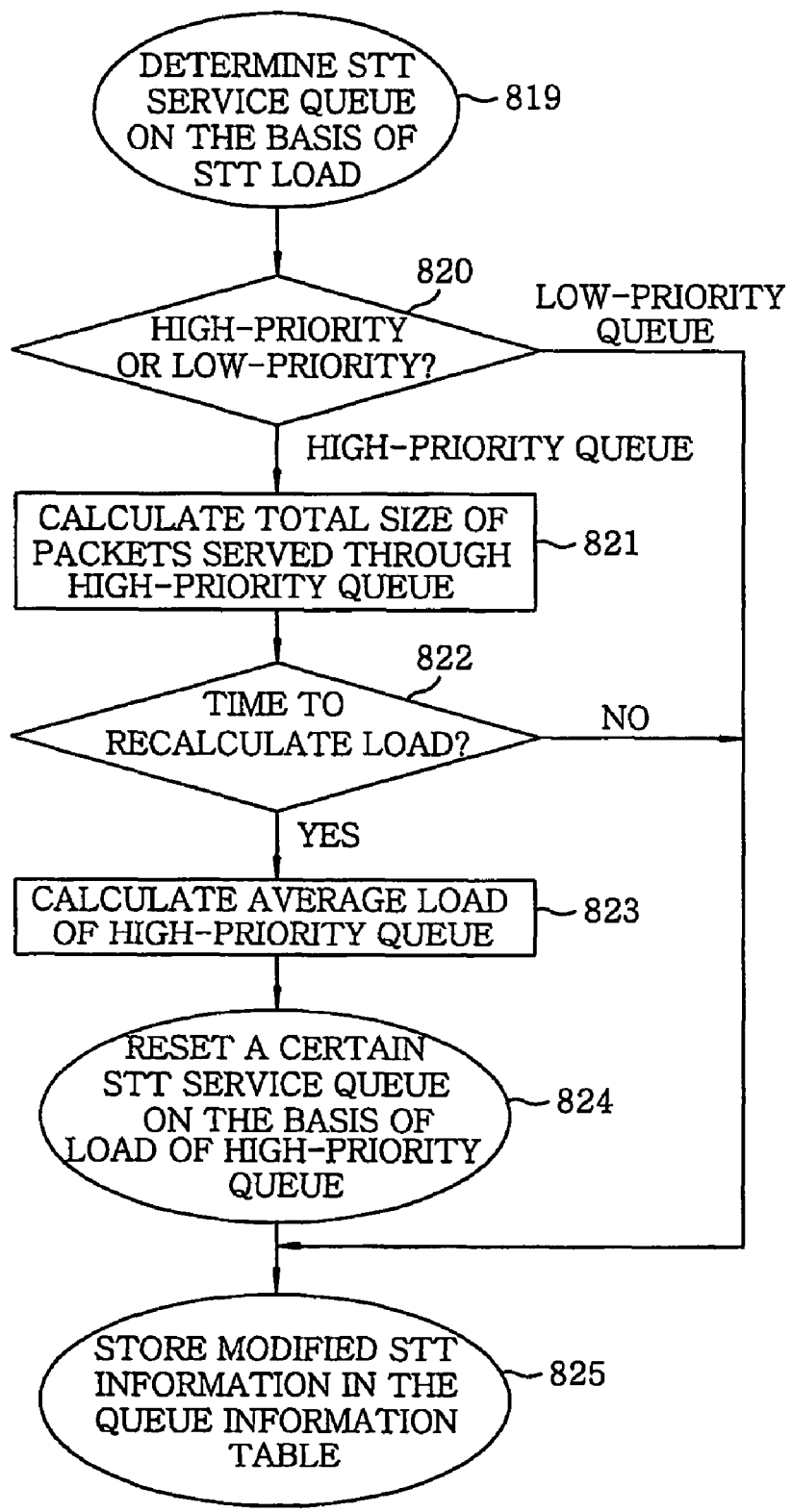
FIG. 8C provides a flowchart of an algorithm of a step for calculating an average load of a high-priority queue in the basic algorithm of the queue coordinator illustrated in FIG. 7.

FIG. 8C provides a flowchart of an algorithm of a step for calculating an average load of the high-priority queue 505 (step 705) in the basic algorithm of the queue coordinator 503 illustrated in FIG. 7. Such algorithm is only carried out when a service queue of a received packet is a high-priority queue.

The queue coordinator 503 determines an STT service queue on the basis of an STT load (step 819) and then checks whether the service queue used by the received packet is a high-priority queue or a low-priority queue (step 820). As a result of the step 820, if the service queue used by the received packet is a high-priority queue, a total size of packets served through the high-priority queue is calculated (step 821). Next, the queue coordinator 503 checks whether it is time to recalculate a load (step 822). According to the check result, if it is time to recalculate the load, an average load of the high-priority queue is calculated (step 823). Then, the queue coordinator 503 resets a certain STT service queue on the basis of the load of the high-priority queue (step 824), to thereby store modified STT information in the queue information table 502 (step 825).

Figure 8D:
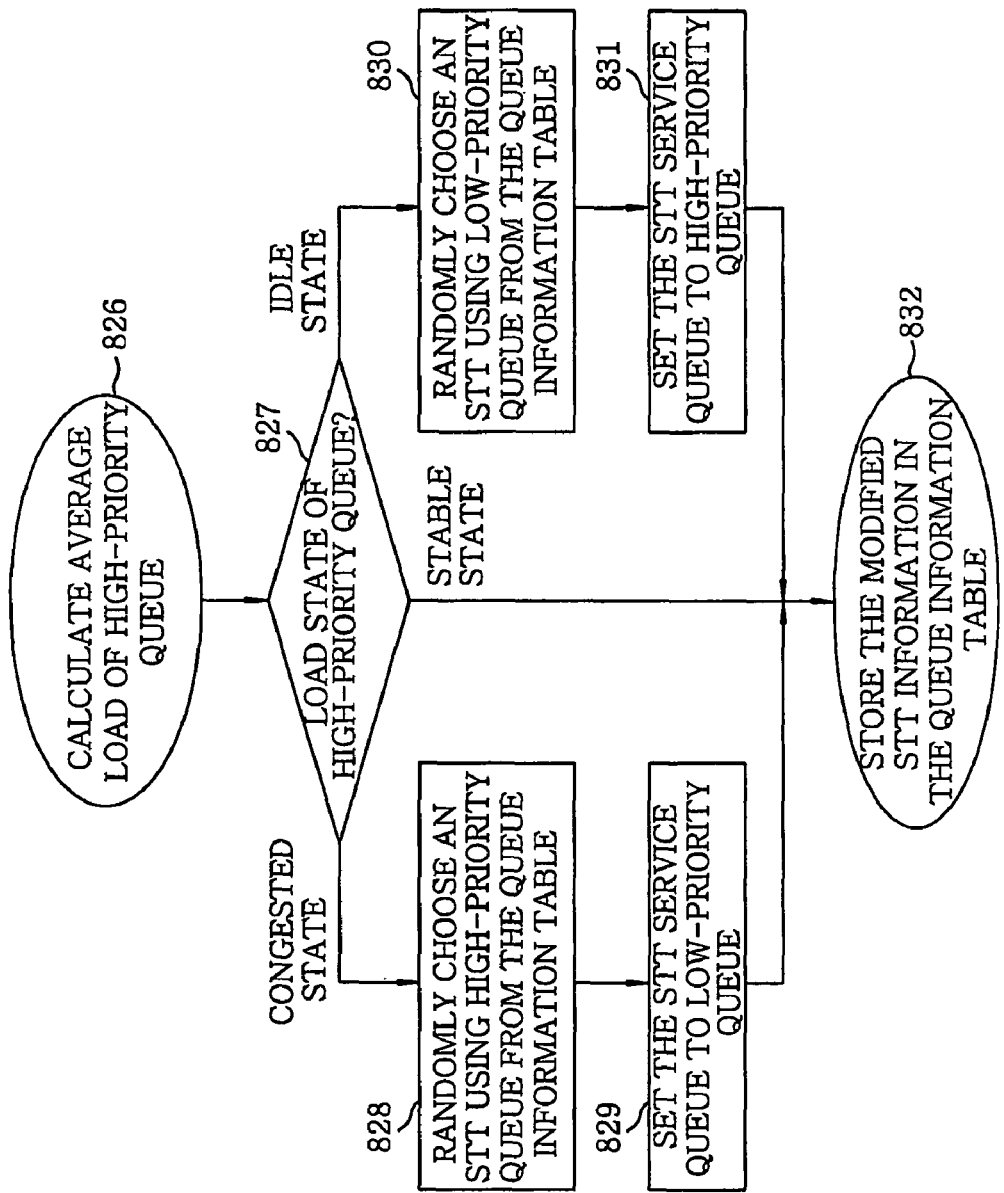
FIG. 8D provides a flowchart of an algorithm of a step for resetting an STT service queue based on the load of the high priority queue in the basic algorithm of the queue coordinator shown in FIG. 7.

FIG. 8D provides a flowchart of an algorithm of a step for resetting an STT service queue based on the load of the high priority queue (step 706) in the basic algorithm of the queue coordinator 503 shown in FIG. 7, wherein the algorithm is executed whenever the average load of the high-priority queue is calculated.

The queue coordinator 503 calculates the average load of the high-priority queue (step 826) and checks a load state of the high-priority queue, e.g., a congested state, an idle state or a stable state (step 827). If the load of the high-priority queue is in the congested state, an STT using the high-priority queue is randomly chosen and a queue of the STT is set to low-priority (steps 828 and 829). Meanwhile, if the load thereof is in the idle state, an STT using a low-priority queue is randomly chosen and a queue of the STT is set to high-priority (steps 830 and 831). If the load thereof is in the stable state or the steps 829 to 831 have already been performed, modified STT information is stored in the queue information table 502 (step 832). As a result, the high-priority queue is able to maintain a stable load thereof. Further, STT using the high-priority queue, i.e., legitimate traffic, can be of high quality.

Figure 9A:
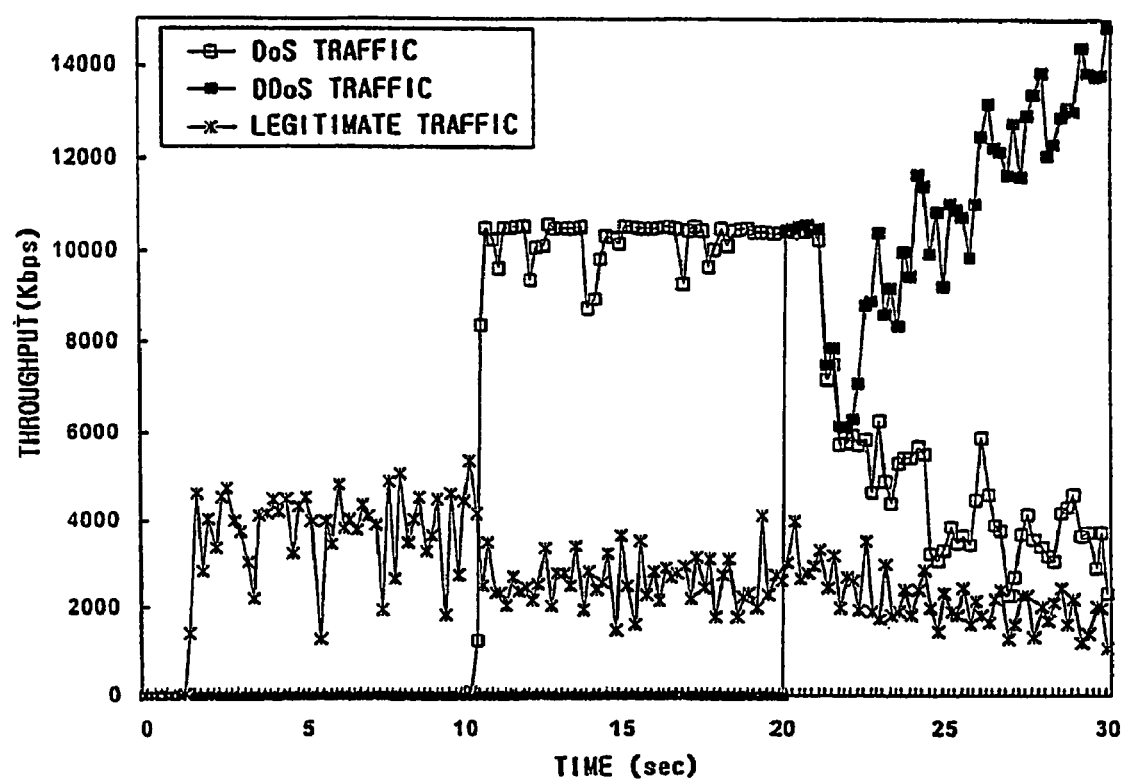
FIG. 9A presents a drawing for representing a simulation result of employing the conventional fair-queuing against web server attacks using DoS and DDoS.
Figure 9B:
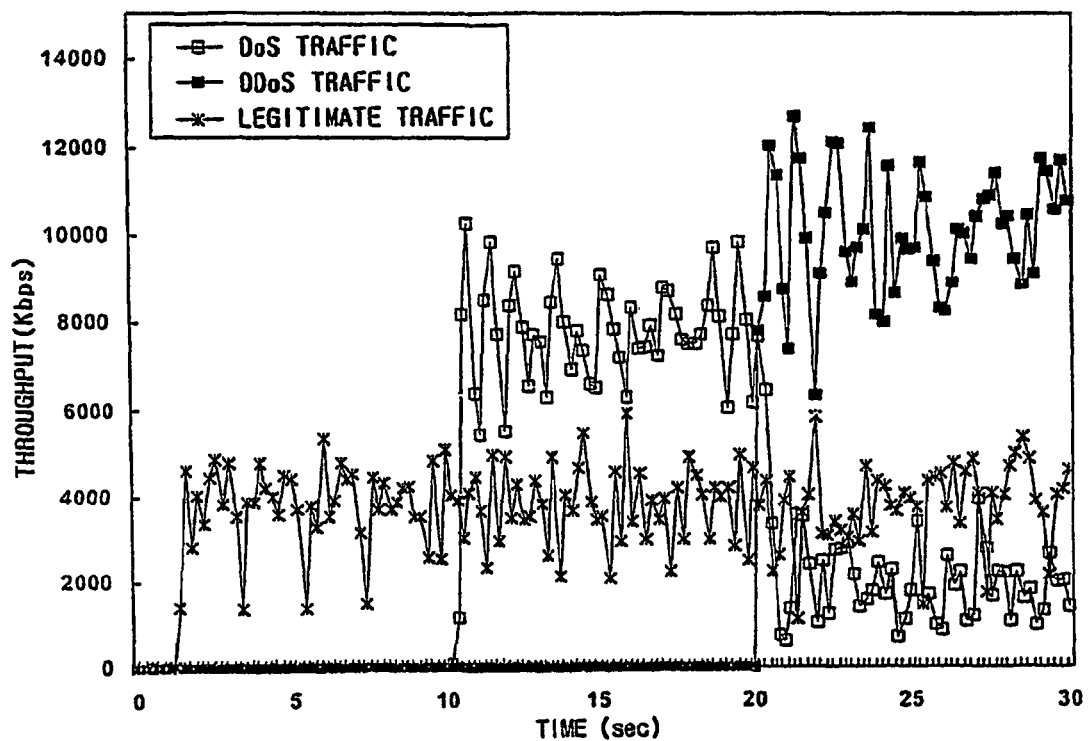
FIG. 9B represents a drawing for showing a simulation result of employing a traffic control technique in accordance with the present invention against web server attacks using the DoS and DDoS.

FIG. 9A presents a drawing for representing a simulation result of employing the conventional fair-queuing against web server attacks using DoS and DDoS. FIG. 9B represents a drawing for showing a simulation result of employing a traffic control technique in accordance with the present invention against web server attacks using the DoS and DDoS.

In prior arts, legitimate traffic is influenced by both the DoS and DDoS attacks as shown in FIG. 9A. However, both the DoS and DDoS attacks hardly have influence on the legitimate traffic in the present invention as illustrated in FIG. 9B.

The present invention checks traffic on an STT basis instead of on a flow basis, so that a load can be more accurately measured without influencing on a performance of an apparatus. Whenever a packet of an STT is received, it is checked whether the specific STT is DDoS traffic or legitimate traffic. Accordingly, the DDoS traffic is quickly set to a low-priority queue as shown in 8b. Although traffic is dramatically increased due to the DDoS attacks, a load of a high-priority queue used by legitimate traffic is constantly maintained. As a result, a loss of the legitimate traffic can be minimized as illustrated in FIG. 8b to 8d. The present invention has an additional merit that even when a considerable traffic is generated by a specific system, if there is sufficient network resource to accept it, the traffic can be served through high-priority queue.

While the invention has been shown and described with respect to the preferred embodiments, it will be understood by those skilled in the art that various changes and modifications may be made without departing from the spirit and scope of the invention as defined in the following claims.

What is claimed is:

1. An apparatus connected between a network access unit and a network to be protected, for protecting legitimate traffic from DoS (denial of service) and DDoS (distributed denial of service) attacks, said apparatus comprising:
   a hardware unit which is connected between the network access unit and the network to be protected;
   said hardware unit comprising:
   a high-priority queue;
   a low-priority queue;
   a queue information table having, for each specific STT (source-based traffic trunk),
      previous load information, and
      a service queue for a specific packet having the specific STT, wherein the service queue is the high-priority queue or the low-priority queue;
   a packet classifier for
      (a) obtaining an STT of a packet received from the network access unit based on a source IP address of the received packet;
      (b) searching the queue information table for the service queue corresponding to the STT of the received packet and checking, by the packet classifier, whether the service queue is the high-priority queue or the low-priority queue;
      (c) transferring the received packet to the high-priority queue if the service queue is the high-priority queue in the step (b);
      (d) transferring the received packet to the low-priority queue if the service queue is the low-priority queue in the step (b); and
      (e) transferring packet information on the received packet to a queue coordinator;
   said queue coordinator for
      (f) updating the service queue associated with the STT of the received packet in the queue information table, wherein said updating is based on (i) a load of the received packet and (ii) the previous load information stored in the queue information table in association with the STT of the received packet;
   wherein said updating at (f) comprises:
      (a') calculating an average load of the STT of the received packet based on the packet information transferred from the packet classifier;
      (b') selectively resetting the service queue associated with the STT of the received packet depending on the calculated average load of the STT of the received packet; and
      (c') storing the selectively reset service queue in the queue information table; and wherein said selectively resetting at (b') further includes:
      (b'1) setting the service queue associated with the STT of the received packet to be the low-priority queue if the calculated average load of the STT of the received packet is greater than an allowable load when the high-priority queue is in a congested state;
      (b'2) randomly choosing a first STT, which uses the low-priority queue, from the queue information table if the service queue associated with the STT of the received packet is the high-priority queue;
      (b'3) following the step (b'2), setting a service queue associated with the randomly chosen first STT to be the high-priority queue and the service queue associated with the STT of the received packet to be the low-priority queue if the average load of the STT of the received packet is greater than that of the randomly chosen first STT;
      (b'4) randomly choosing a second STT, which uses the high-priority queue, from the queue information table if the service queue associated with the STT of the received packet is the low-priority queue; and
      (b'5) following the step (b'4), setting the service queue associated with the STT of the received packet to be the high-priority queue and a service queue associated with the randomly chosen second STT to be the low-priority queue if the average load of the STT of the received packet is smaller than that of the randomly chosen second STT; and
   a buffer for buffering outputs of the high-priority queue and the low-priority queue and providing the buffered outputs to the network to be protected.

2. The apparatus of claim 1, wherein the network to be protected comprises a server.

3. The apparatus of claim 1, wherein the information on the received packet includes a packet size, a packet arrival time and an STT index representing the STT of the received packet.

4. The apparatus of claim 1, wherein the queue information table has fields including:
   an STT ID field,
   a service queue field,
   an average load field,
   a recent load calculation time field, and
   a total packet size field.

5. The apparatus of claim 1, wherein a maximum load of both the high-priority queue and the low-priority queue is set to be a maximum allowable load of the network to be protected.

6. The apparatus of claim 5, wherein the network to be protected comprises a server.

7. The apparatus of claim 1, further comprising at least a network interface for network connection to the network access unit and the network to be protected.

8. A method of protecting legitimate traffic from DoS (denial of service) and DDoS (distributed denial of service) attacks, said method performed by an apparatus which is a hardware unit connected between a network access unit and a network to be protected and including:
   a queue information table having, for each specific STT (source-based traffic trunk),
      previous load information, and
      a service queue for a specific packet having the specific STT, wherein the service queue is a high-priority queue or a low-priority queue,
   a queue coordinator, and
   a packet classifier, the method comprising the steps of:
- (a) obtaining, by the packet classifier in said hardware unit, an STT of a packet received from the network access unit based on a source IP address of the received packet;
- (b) searching, by the packet classifier, the queue information table for the service queue corresponding to the STT of the received packet and checking, by the packet classifier, whether the service queue is the high-priority queue or the low-priority queue;
- (c) transferring, by the packet classifier, the received packet to the high-priority queue if the service queue is the high-priority queue in the step (b);
- (d) transferring, by the packet classifier, the received packet to the low-priority queue if the service queue is the low-priority queue in the step (b);
- (e) transferring, by the packet classifier, packet information on the received packet to the queue coordinator; and
- (f) updating, by the queue coordinator in said hardware unit, the service queue associated with the STT of the received packet in the queue information table, wherein said updating is based on (i) a load of the received packet and (ii) the previous load information stored in the queue information table in association with the STT of the received packet;

wherein the step (f) comprises the following steps performed by the queue coordinator:
- (a') calculating an average load of the STT of the received packet based on the packet information transferred from the packet classifier;
- (b') selectively resetting the service queue associated with the STT of the received packet depending on the calculated average load of the STT of the received packet;
- (c') calculating an average load of the high-priority queue;
- (d') selectively resetting a service queue associated with a certain STT depending on the calculated average load of the high-priority queue; and
- (e') storing the selectively reset service queue in the queue information table; and wherein the step (b') further includes the steps of:
- (b'1) setting the service queue associated with the STT of the received packet to be the low-priority queue if the calculated average load of the STT of the received packet is greater than an allowable load when the high-priority queue is in a congested state;
- (b'2) randomly choosing a first STT, which uses the low-priority queue, from the queue information table if the service queue associated with the STT of the received packet is the high-priority queue;
- (b'3) following the step (b'2), setting a service queue in said hardware unit associated with the randomly chosen first STT to be the high-priority queue and the service queue associated with the STT of the received packet to be the low-priority queue if the average load of the STT of the received packet is greater than that of the randomly chosen first STT;
- (b'4) randomly choosing a second STT, which uses the high-priority queue, from the queue information table if the service queue associated with the STT of the received packet is the low-priority queue; and
- (b'5) following the step (b'4), setting the service queue associated with the STT of the received packet to be the high-priority queue and a service queue associated with the randomly chosen second STT to be the low-priority queue if the average load of the STT of the received packet is smaller than that of the randomly chosen second STT.

9. The method of claim 8, wherein the step (c') further includes the steps of:
- (c'1) determining whether the service queue associated with the STT of the received packet after the selective resetting in the step (b') is the high-priority queue or the low-priority queue;
- (c'2) calculating a total packet size served through the high-priority queue if the service queue associated with the STT of the received packet is the high-priority queue;
- (c'3) calculating the average load of the high-priority queue if it is time to recalculate the average load of the high-priority queue; and
- (c'4) proceeding to the step (d').

10. The method of claim 8, wherein the network to be protected comprises a server.

11. The method of claim 8, wherein the step (e') further comprises:
storing a modified average load in the queue information table.

12. The method of claim 8, wherein the step (a') further includes the steps of:
- (a'1) calculating a total packet size based on the packet information transferred from the packet classifier;
- (a'2) checking whether it is time to recalculate the average load;
- (a'3) if it is time to recalculate the average load in the step (a'2), calculating a new average load by using (i) a previous average load and (ii) a current average load based on the total packet size, and then proceeding to the step (b'); and
- (a'4) if it is not time to recalculate the average load, proceeding to the step (b').

13. The method of claim 12, wherein the packet information includes a packet size, a packet arrival time, and an STT index corresponding to the STT of the received packet.

14. The method of claim 8, wherein the apparatus further comprises at least a network interface in network connection with the network access unit and the network to be protected.

15. A method of protecting legitimate traffic from DoS (denial of service) and DDoS (distributed denial of service) attacks, said method performed by an apparatus which is a hardware unit connected between a network access unit and a network to be protected and including:
- a queue information table having, for each specific STT (source-based traffic trunk),
  - previous load information, and
  - a service queue for a specific packet having the specific STT, wherein the service queue is a high-priority queue or a low-priority queue,
- a queue coordinator, and
- a packet classifier, the method comprising the steps of:
- (a) obtaining, by the packet classifier in said hardware unit, an STT of a packet received from the network access unit based on a source IP address of the received packet;
- (b) searching, by the packet classifier, the queue information table for the service queue corresponding to the STT of the received packet and checking, by the packet classifier, whether the service queue is the high-priority queue or the low-priority queue;
- (c) transferring, by the packet classifier, the received packet to the high-priority queue if the service queue is the high-priority queue in the step (b);
- (d) transferring, by the packet classifier, the received packet to the low-priority queue if the service queue is the low-priority queue in the step (b);

(e) transferring, by the packet classifier, packet information on the received packet to the queue coordinator; and (f) updating, by the queue coordinator in said hardware unit, the service queue associated with the STT of the received packet in the queue information table, wherein said updating is based on (i) a load of the received packet and (ii) the previous load information stored in the queue information table in association with the STT of the received packet;

wherein the step (f) comprises the following steps performed by the queue coordinator:

(a') calculating an average load of the STT of the received packet based on the packet information transferred from the packet classifier;

(b') selectively resetting the service queue associated with the STT of the received packet depending on the calculated average load of the STT of the received packet;

(c') calculating an average load of the high-priority queue;

(d') selectively resetting a service queue associated with a certain STT depending on the calculated average load of the high-priority queue; and (e') storing the selectively reset service queue in the queue information table; and wherein the step (d') includes the steps of:

(d'1) obtaining the calculated average load of the high-priority queue from the step (c');

(d'2) randomly choosing one STT, which uses the high-priority queue, and setting a service queue of the randomly chosen STT to the low-priority queue if the calculated average load of the high-priority queue indicates that the high-priority queue is in a congested state;

(d'3) randomly choosing one STT, which uses the low-priority queue, and setting a service queue of the randomly chosen STT to the high-priority queue if the calculated average load of the high-priority queue indicates that the high-priority queue is in an idle state; and (d'4) proceeding to the step (e') if the calculated average load of the high-priority queue indicates that the high-priority queue is in a stable state or when one of the steps of (d'2) and (d'3) is performed.

16. A method of protecting legitimate traffic from DoS (denial of service) and DDoS (distributed denial of service) attacks, said method performed by an apparatus which is a hardware unit connected between a network access unit and a network to be protected and including:

a queue information table having, for each specific STT (source-based traffic trunk),
previous load information, and
a service queue for a specific packet having the specific STT, wherein the service queue is a high-priority queue or a low-priority queue, a queue coordinator, and a packet classifier, the method comprising the steps of:

(a) obtaining, by the packet classifier in said hardware unit, an STT of a packet received from the network access unit based on a source IP address of the received packet;

(b) searching, by the packet classifier, the queue information table for the service queue corresponding to the STT of the received packet and checking, by the packet classifier, whether the service queue is the high-priority queue or the low-priority queue;

(c) transferring, by the packet classifier, the received packet to the high-priority queue if the service queue is the high-priority queue in the step (b);

(d) transferring, by the packet classifier, the received packet to the low-priority queue if the service queue is the low-priority queue in the step (b);

(e) transferring, by the packet classifier, packet information on the received packet to the queue coordinator; and (f) updating, by the queue coordinator in said hardware unit, the service queue associated with the STT of the received packet in the queue information table, wherein said updating is based on (i) a load of the received packet and (ii) the previous load information stored in the queue information table in association with the STT of the received packet;

wherein the step (f) comprises the following steps performed by the queue coordinator:

(a') calculating an average load of the STT of the received packet based on the packet information transferred from the packet classifier;

(b') selectively resetting the service queue associated with the STT of the received packet depending on the calculated average load of the STT of the received packet; and (c') storing the selectively reset service queue in the queue information table; and wherein the step (b') further includes the steps of:

(b'1) setting the service queue associated with the STT of the received packet to be the low-priority queue if the calculated average load of the STT of the received packet is greater than an allowable load when the high-priority queue is in a congested state;

(b'2) randomly choosing a first STT, which uses the low-priority queue, from the queue information table if the service queue associated with the STT of the received packet is the high-priority queue;

(b'3) following the step (b'2), setting a service queue associated with the randomly chosen first STT to be the high-priority queue and the service queue associated with the STT of the received packet to be the low-priority queue if the average load of the STT of the received packet is greater than that of the randomly chosen first STT;

(b'4) randomly choosing a second STT, which uses the high-priority queue, from the queue information table if the service queue associated with the STT of the received packet is the low-priority queue; and (b'5) following the step (b'4), setting the service queue associated with the STT of the received packet to be the high-priority queue and a service queue associated with the randomly chosen second STT to be the low-priority queue if the average load of the STT of the received packet is smaller than that of the randomly chosen second STT.

17. The method of claim 16, wherein the step (f) further comprises the following steps performed by the queue coordinator after the steps (a') and (b') and before the step (c'):

(d') calculating an average load of the high-priority queue; and (e') selectively resetting a service queue associated with a certain STT depending on the calculated average load of the high-priority queue.

18. The method of claim 17, wherein the step (e') includes the steps of:

(e'1) obtaining the calculated average load of the high-priority queue from the step (d');

(e'2) randomly choosing one STT, which uses the high-priority queue, and setting a service queue of the randomly chosen STT to the low-priority queue if the calculated average load of the high-priority queue indicates that the high-priority queue is in a congested state;

(e'3) randomly choosing one STT, which uses the low-priority queue, and setting a service queue of the randomly chosen STT to the high-priority queue if the calculated average load of the high-priority queue indicates that the high-priority queue is in an idle state; and (e'4) proceeding to the step (c') if the calculated average load of the high-priority queue indicates that the high-priority queue is in a stable state or when one of the steps of (e'2) and (e'3) is performed.

19. The method of claim 18, wherein the step (d') further includes the steps of:

(d'1) determining whether the service queue associated with the STT of the received packet after the selective resetting in the step (b') is the high-priority queue or the low-priority queue;

(d'2) calculating a total packet size served through the high-priority queue if the service queue associated with the STT of the received packet is the high-priority queue;

(d'3) calculating the average load of the high-priority queue if it is time to recalculate the average load of the high-priority queue; and (d'4) proceeding to the step (e').

* * * * *